(12) United States Patent
Lenges et al.

(10) Patent No.: US 7,635,736 B2
(45) Date of Patent: Dec. 22, 2009

(54) HEAT SEAL MODIFIERS FOR LINEAR POLYETHYLENES

(75) Inventors: Geraldine M. Lenges, Wilmington, DE (US); Timothy A. Libert, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 163 days.

(21) Appl. No.: 11/015,954

(22) Filed: Dec. 16, 2004

(65) Prior Publication Data

US 2005/0203249 A1      Sep. 15, 2005

Related U.S. Application Data

(60) Provisional application No. 60/530,080, filed on Dec. 16, 2003.

(51) Int. Cl.
| | | |
|---|---|---|
| *C08L 33/02* | (2006.01) | |
| *C08L 23/00* | (2006.01) | |
| *C08L 23/04* | (2006.01) | |
| *C09J 7/02* | (2006.01) | |
| *C09D 11/10* | (2006.01) | |
| *C08G 18/42* | (2006.01) | |
| *C09B 67/00* | (2006.01) | |
| *C08K 5/00* | (2006.01) | |

(52) U.S. Cl. .............. 525/221; 525/240; 524/271; 524/272; 524/500; 524/502; 524/515

(58) Field of Classification Search .......... 525/221, 525/240; 524/271, 272, 500, 502, 515
See application file for complete search history.

(56) References Cited

U.S. PATENT DOCUMENTS

| | | | |
|---|---|---|---|
| 4,337,298 A | 6/1982 | Karim et al. | |
| 6,120,887 A * | 9/2000 | Werenicz et al. | ........... 428/219 |
| 2002/0146526 A1 * | 10/2002 | Haner et al. | ........... 428/35.7 |

FOREIGN PATENT DOCUMENTS

| | | |
|---|---|---|
| EP | 1344642 | 9/2003 |
| JP | 1982/008234 A | 1/1982 |
| JP | 7060921 | 3/1995 |
| SE | 465778 B | 10/1991 |

OTHER PUBLICATIONS

PCT International Search Report for International Application No. PCT/US2004/043064 dated Jul. 5, 2005.

* cited by examiner

*Primary Examiner*—Nathan M Nutter

(57) ABSTRACT

The present invention is linear polyethylene composition suitable for use as a heat seal resin, wherein the resin comprises: (a) from about 70 wt % to about 90 wt % of a linear polyethylene having a density of from about 0.88 to about 0.92 g/cm$^3$; (b) from about 0 wt % to about 30 wt % of a copolymer of ethylene and an α,β-unsaturated carboxylic acid and/or an ionomer thereof; and, (c) from about 2 wt % to about 10 wt % of a tackifier.

13 Claims, No Drawings

HEAT SEAL MODIFIERS FOR LINEAR POLYETHYLENES

This application claims the benefit of U.S. Provisional Application No. 60/530,080, filed Dec. 16, 2003, which is incorporated by reference herein for all purposes as if fully set forth.

BACKGROUND OF THE INVENTION

1. Field of the Invention

This invention relates to polyethylene compositions for use in packaging. This invention particularly relates to metallocene polyolefin compositions comprising a heat seal modifier.

2. Description of the Prior Art

Polyethylene polymers are useful in packaging, as well as in other applications. The use of linear polyolefins is not without problems to a manufacturer, however. One problem that a manufacturer may be faced with is finding a proper balance between the cost of manufacture and the performance of the manufactured product. Linear polyethylenes produced using a single site metallocene catalyst can have many performance benefits. However, linear polyethylenes can also be difficult to process in a cost-efficient manner.

Moreover, linear (metallocene) polyethylenes can have less than desirable heat seal properties. That is, linear polyethylenes often do not provide sufficient adhesion between the sealing layers of polyethylene to result in a good adhesive seal for a package. Efforts to improve the heat seal characteristics of linear polyethylenes by blending them with other materials, such as ethylene copolymers with methacrylic acid or acrylic acid, have not had universal success.

Thus, it can be desirable to have a linear polyethylene composition which is more easily processible in the melt, and at the same time provides desirable heat seal characteristics for packaging applications.

SUMMARY OF THE INVENTION

In one aspect, the present invention is linear polyethylene composition suitable for use as a heat seal resin, wherein the resin comprises: (a) from about 70 wt % to about 90 wt % of a linear polyethylene having a density of from about 0.88 to about 0.95 g/cm$^3$; (b) from about 0 to about 30 wt % of a copolymer selected from: an ethylene acid copolymer; an ethylene acid copolymer ionomer; or a mixture thereof; and, (c) from about 2 wt % to about 10 wt % of a tackifier.

In another aspect, the present invention is a heat seal modifier composition comprising: (a) from about 0 wt % to about 90 wt % of an ethylene acid copolymer, an ethylene acid copolymer ionomer, or a mixture thereof; (b) from about 10 wt % to about 100 wt % of a tackifier; and, optionally, (c) up to about 10 wt % of a metallocene polyethylene polymer.

In another aspect, the present invention is a process for manufacturing a package comprising the step: including with a polyethylene resin having a density of from about 0.88 g/cm$^3$ to about 0.95 g/cm$^3$, a heat seal modifier wherein the modifier comprises (a) from about 0 wt % to about 90 wt % of a copolymer comprising an ethylene acid copolymer, an ethylene acid copolymer ionomer, or a mixture thereof, and preferably comprising an at least partially neutralized ethylene acid copolymer; (b) from about 10 wt % to about 90 wt % of a tackifier; and, optionally, (c) up to about 10 wt % of a metallocene polyethylene polymer.

In another aspect, the present invention is a package comprising a polyethylene heat seal resin, wherein the resin comprises: (a) from about 70 wt % to about 90 wt % of a linear polyethylene having a density of from about 0.90 to about 0.95 g/cm$^3$; (b) from about 0 to about 30 wt % of a copolymer selected from: an ethylene acid copolymer; an ethylene acid copolymer ionomer; or a mixture thereof; and, (c) from about 2 wt % to about 10 wt % of a tackifier.

DETAILED DESCRIPTION OF THE INVENTION

The definitions herein apply to the terms as used throughout this specification, unless otherwise limited in specific instances.

The term "finite amount", as used herein, refers to an amount that is not equal to zero.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

In one embodiment, the present invention is a linear polyethylene composition. As used herein, the term "linear polyethylene" refers to a polyethylene resin obtained by using a single site (metallocene) catalyst. The linear polyethylene composition of the invention is useful as a heat seal resin, for example.

Linear polyethylenes suitable for use in the practice of the present invention have a density of from about 0.88 g/cm$^3$ to about 0.95 g/cm$^3$. Preferably, the linear polyethylene has a density of from about 0.90 g/cm$^3$ to about 0.94 g/cm$^3$. More preferably, the linear polyethylene has a density of from about 0.91 g/cm$^3$ to about 0.93 g/cm$^3$.

The linear polyethylene composition of the invention preferably comprises about 70 wt % to about 90 wt % of the linear polyethylene, based on the total weight of the linear polyethylene composition. Of note are compositions comprising 75 wt % to 85 wt % and about 80 wt % of the linear polyethylene.

The linear polyethylene composition of the invention also includes at least one copolymer selected from an ethylene acid copolymer; an ethylene acid copolymer ionomer; or a mixture thereof (collectively referred to herein as "acid copolymer"). Suitable and preferred ethylene acid copolymers and ionomers are as set forth below with respect to the heat seal resin modifier compositions of the invention. The acid copolymer can be present in the linear polyethylene composition in an amount of from about 0 to about 30 wt %, based on the total weight of the linear polyethylene composition. Preferably, the acid copolymer is present in the linear polyethylene composition in a finite amount up to about 30 wt %, more preferably in an amount of from about 10 to about 30 wt %, more preferably in an amount of from about 10 to about 25 wt %, and still more preferably in an amount of from about 12 to about 23 wt %, based on the weight of the linear polyethylene composition.

The linear polyethylene composition of the invention also includes a tackifier. Suitable and preferred tackifiers are as set forth below with respect to the heat seal resin modifier compositions of the invention. Preferably, the linear polyethylene composition includes from about 2 wt % to about 10 wt % of the tackifier, based on the total weight of the linear polyethylene composition. More preferably, the tackifier is present in an amount of from about 3 to about 10 wt %, and still more preferably in an amount of from about 4 to about 8 wt % in the heat seal resin. Also of note are compositions comprising about 2 wt % to about 5 wt % and about 2 wt % of the tackifier.

The components of the linear polyethylene composition may be blended by any suitable means known in the art. Preferably the components are melt-blended, e.g., in an extruder.

The linear polyethylene composition may be applied to the packaging material to be sealed, and the seal may be formed, by any suitable means known in the art. See, e.g., the *Wiley Encyclopedia of Packaging Technology*, 2d edition, A. L. Brody and K. S. Marsh, Eds., Wiley-Interscience (Hoboken, 1997).

Conventional heat seal resin compositions have heat seal initiation temperatures that vary depending on the resin composition. Typically, it is preferable to use a resin with a heat seal temperature that is as low as possible but that will still provide a seal strength that is desirable for the desired application. For example, if a heat seal of 1500 g/inch is desirable in a particular application, a manufacturer may find it advantageous to choose a material that can provide a seal of that strength at a temperature of 250° F. rather than a material that can provide that seal strength at a temperature of 280° F. A heat seal composition capable of providing equivalent heat seal strength at lower temperatures improves economic efficiency by allowing faster processing times and lower energy costs.

Advantageously, the linear polyethylene composition of the present invention may possess a lower heat seal initiation temperature than a similar or identical unmodified linear polyethylene resin, each providing about the same heat seal strength.

A heat seal resin modifier of the present invention may be useful for lowering the heat seal initiation temperature of a polyethylene resin. Preferably, the polyethylene resin is a linear polyethylene resin. Also preferably, the polyethylene resin has a density of from about 0.88 to about 0.92 g/cm$^3$. Also preferably, the modified resin attains a seal strength of greater than about 25 g/inch and up to about 6000 g/inch within a temperature range of from about 150° F. to about 350° F.

Desirable heat seal characteristics can vary depending upon the application for which the sealing is intended. However, for the purposes of the present invention, desirable heat seal characteristics are demonstrated within a heat seal initiation temperature range of from about 150° F. to about 350° F. Preferably, the heat seal initiation temperature for the modified resins of the present invention is within a range of from about 175° F. to about 300° F., more preferably within a range of from about 180° F. to about 290° F., and still more preferably within a range of from about 200° F. to about 290° F.

Preferably, the modified resin of the present invention has a heat seal strength in the range of from about 25 grams/inch to about 6,000 grams/inch over the desirable heat seal initiation temperature range of from about 150° F. to about 350° F. More preferably, the modified heat seal resin has a heat seal strength of from about 1000 grams/inch to about 4,000 grams/inch, and still more preferably from about 1500 grams/inch to about 4,000 grams/inch. Seal strength is determined according to ASTM F-88.

The heat seal resin modifier of the present invention is a composition comprising (a) an ethylene acid copolymer; (b) a tackifier; and, optionally, (c) a metallocene polyethylene polymer. Ethylene acid copolymers suitable for use in the present invention include copolymers, for example, dipolymers and terpolymers, of ethylene and α,β-unsaturated carboxylic acids and/or derivatives thereof. α,β-Unsaturated carboxylic acids and derivatives suitable for use herein include, without limitation, acrylic acid and/or methacrylic acid (generically referred to herein singularly or in combination as (meth)acrylic acid); acrylic esters such as methyl (meth)acrylate, ethyl(meth)acrylate, isobutylacrylate or mixtures thereof. Terpolymers are preferably ethylene/methacrylic acid/isobutyl acrylate copolymers.

Ionomers of the ethylene acid copolymers are preferred for use in the present invention. Ionomers are well known in the polymer art, and are the fully or at least partially neutralized salts of ethylene acid copolymers. Also preferably, if used in the present invention, an ionomer is in the form of the sodium salt, the zinc salt, or a mixture of salts of these two metal ions.

The modifier composition can comprise from about 0 to about 90 wt % of the acid copolymer. Preferably, the acid copolymer is present in the modifier composition a finite amount up to about 90 wt %, or in an amount of from about 40 to about 90 wt %, more preferably in an amount of from about 50 to about 90 wt %, and still more preferably in an amount of from about 60 to about 90 wt %, based on the total weight of the modifier composition.

A heat seal resin modifier of the present invention further comprises a tackifier. When used conventionally, tackifiers are generally materials which provide tack, or adhesiveness, to a composition at room or ambient temperatures. In the practice of the present invention, however, use of a tackifier is not conventional. Heat seal properties desirable in a linear polyethylene heat seal resin of this invention are required to be exhibited at temperatures much greater than ambient. Because most tackifiers become liquid and lose tack at the temperatures contemplated in the practice of this invention, it is surprising that conventional tackifiers can be made to provide the heat seal properties obtained when combined with linear polyethylenes. Suitable tackifiers for use in the present invention can be selected from conventional tackifiers, and mixtures thereof. Preferably, tackifiers of the present invention can be selected from polyterpenes, hydrogenated aromatic 9-carbon esters, or mixtures thereof.

The heat seal resin modifier composition comprises the tackifier in an amount of from about 10 to about 90 wt % based on the total weight of the modifier composition. Preferably the tackifier is present in the modifier composition in an amount of from about 10 to about 60 wt %, more preferably in an amount of from about 15 to about 50 wt %, and still more preferably in an amount of from about 20 to about 40 wt % of the modifier composition.

A modifier of the present invention can optionally comprise from about 0 to about 10 wt %, based on the weight of the modifier composition, of a metallocene polyethylene plastomer, having a density of from about 0.87 to about 0.90 g/cm$^3$. Preferably, the metallocene polyethylene plastomer is present in a finite amount up to about 10 wt %.

A heat seal resin modifier of the present invention can be prepared by blending the components by conventional methods, such as by melt blending, dry blending and coextruding, or using a batch mixing process. Any known method of making a blend of the present invention is contemplated as suitable for use herein. Likewise, the heat seal resin modifier and the heat seal resin to be modified may be blended by any suitable means known in the art. Preferably the components are melt-blended, for example in an extruder.

Also provided by the present invention is a package comprising a linear polyethylene composition or a heat seal resin modifier of the invention. The package may comprise any packaging material to which the linear polyethylene composition or a heat seal resin modifier of the invention will adhere.

The package may be made and sealed by any suitable means known in the art. See, e.g., the *Wiley Encyclopedia of Packaging Technology*.

Also provided by the present invention is a method of manufacturing a package comprising the step of including with a polyethylene resin having a density of from about 0.88 g/cm$^3$ to about 0.95 g/cm$^3$, a heat seal modifier according to the invention. In all other respects, the package may be made and sealed by any suitable means known in the art.

EXAMPLES

The Examples are for illustrative purposes only, and are not intended to limit the scope of the invention.

A series of blends was prepared by melt blending the components in the proportions listed in Table 1. The heat seal strength of the blends was measured according to ASTM F-88. The term "heat seal initiation temperature", as used herein, refers to the temperature at which a seal strength of 1500 g/in is developed. The heat seal strength results, which are also shown in Table 1, demonstrate that the heat seal initiation temperature of the examples of the invention is in general significantly lower than the heat seal initiation temperature of the comparative example.

TABLE 1

| | | Modifier | | Heat Seal Strength, g/in, Measured at Temperature | | | | | | |
|---|---|---|---|---|---|---|---|---|---|---|
| | | EAC$^2$ | Piccolyte | | | | | | | |
| Example | PE$^1$ (wt %) | (wt %) | C115$^3$ (wt %) | 180° F. | 200° F. | 220° F. | 240° F. | 260° F. | 280° F. | 300° F. |
| $^a$C1 | 100 | 0 | 0 | 17 | 15 | 16 | 88 | 2331 | 4871 | 6573 |
| 1 | 75 | 15 | 10 | 14 | 17 | 84 | 1658 | 3870 | 4829 | 5616 |
| 2 | 75 | 23 | 2 | 12 | 13 | 161 | 1754 | 4451 | 5224 | 5061 |
| 3 | 85 | 9 | 6 | 4 | 3 | 62 | 31 | 2035 | 4372 | 5860 |
| 4 | 90 | 0 | 10 | 4 | 30 | 66 | 1493 | 3474 | 4651 | 5040 |
| 5 | 95 | 3 | 2 | 13 | 6 | 12 | 169 | 3321 | 4605 | 5439 |
| 6 | 90 | 0 | 10 | 11 | 13 | 31 | 374 | 3475 | 4603 | 5863 |
| 7 | 75 | 23 | 2 | 44 | 12 | 34 | 1266 | 3724 | 4182 | 5095 |
| 8 | 85 | 13 | 2 | 22 | 12 | 18 | 26 | 3379 | 5016 | 5725 |

Notes:
$^1$Linear low density polyethylene, metallocene catalyzed; d = 0.918 g/cm$^3$.
$^2$Nucrel ® AE, available from E. I. du Pont de Nemours and Company of Wilmington, DE (DuPont).
$^3$Available from Hercules, Inc., of Wilmington, DE.
$^a$Not an example of the present invention.

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A linear polyethylene composition consisting essentially of: (a) from about 70 wt % to about 90 wt % of a linear polyethylene having a density of from about 0.88 to about 0.95 g/cm$^3$; (b) an amount that is not equal to zero up to an amount of about 30 wt % of a mixture of an ethylene acid copolymer and an ethylene acid copolymer ionomer; wherein the acid is an α,β-unsaturated carboxylic acid selected from the group consisting of acrylic acid, methacrylic acid and mixtures thereof, and wherein the ethylene acid copolymer or the ethylene acid copolymer ionomer optionally further comprises one or more acid derivatives selected from the group consisting of methyl acrylate, methyl methacrylate, ethyl acrylate, ethyl methacrylate, isobutylacrylate and mixtures thereof; and, (c) about 4 to about 8 wt % of a tackifier.

2. A package comprising a heat seal resin, wherein the heat seal resin consists essentially of: (a) from about 70 wt % to about 90 wt % of a linear polyethylene having a density of from about 0.88 to about 0.95 g/cm$^3$; (b) an amount that is not equal to zero up to an amount of about 30 wt % of a mixture of an ethylene acid copolymer and an ethylene acid copolymer ionomer; wherein the acid is an α,β-unsaturated carboxylic acid selected from the group consisting of acrylic acid, methacrylic acid and mixtures thereof, and wherein the ethylene acid copolymer or the ethylene acid copolymer ionomer optionally further comprises one or more acid derivatives selected from the group consisting of methyl acrylate, methyl methacrylate, ethyl acrylate, ethyl methacrylate, isobutylacrylate and mixtures thereof; and, (c) from about 4 wt % to about 8 wt % of a tackifier.

3. The linear polyethylene composition of claim 1, wherein the linear polyethylene has a density of from about 0.91 to about 0.93 g/cm$^3$.

4. The linear polyethylene composition of claim 1, comprising about 75 to about 85 wt % of the linear polyethylene.

5. The linear polyethylene composition of claim 1, comprising about 80 wt % of the linear polyethylene.

6. The linear polyethylene composition of claim 1, comprising about 6 wt % of the tackifier.

7. The linear polyethylene composition of claim 1, comprising about 10 to about 30 wt % of the mixture of the ethylene acid copolymer and the ethylene acid copolymer ionomer.

8. The linear polyethylene composition of claim 1, comprising about 12 to about 23 wt % of the mixture of the ethylene acid copolymer and the ethylene acid copolymer ionomer.

9. The linear polyethylene composition of claim 1, wherein the mixture of the ethylene acid copolymer and the ethylene acid copolymer ionomer comprises a copolymer of ethylene, methacrylic acid and isobutyl acrylate and an ionomer of said copolymer of ethylene, methacrylic acid and isobutyl acrylate.

10. The linear polyethylene composition of claim 1, having a heat seal initiation temperature range of from about 150° F. to about 350° F.

11. The linear polyethylene composition of claim 1, having a heat seal initiation temperature range of from about 180° F. to about 290° F.

12. The linear polyethylene composition of claim 1, having a heat seal strength of about 25 grams/inch to about 6,000 grams/inch as determined by ASTM F-88 over a heat seal initiation temperature range of from about 150° F. to about 350° F.

13. The linear polyethylene composition of claim 1, having a heat seal strength of from about 1500 grams/inch to about 4,000 grams/inch as determined by ASTM F-88 over a heat seal initiation temperature range of from about 150° F. to about 350° F.

* * * * *

UNITED STATES PATENT AND TRADEMARK OFFICE
CERTIFICATE OF CORRECTION

PATENT NO. : 7,635,736 B2
APPLICATION NO. : 11/015954
DATED : December 22, 2009
INVENTOR(S) : Lenges et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 209 days.

Signed and Sealed this

Ninth Day of November, 2010

David J. Kappos
*Director of the United States Patent and Trademark Office*